(12) United States Patent
Haugen

(10) Patent No.: US 7,681,394 B2
(45) Date of Patent: Mar. 23, 2010

(54) CONTROL METHODS FOR LOW EMISSION INTERNAL COMBUSTION SYSTEM

(75) Inventor: David James Haugen, Ann Arbor, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 987 days.

(21) Appl. No.: 11/389,385

(22) Filed: Mar. 24, 2006

(65) Prior Publication Data

US 2007/0220864 A1        Sep. 27, 2007

Related U.S. Application Data

(60) Provisional application No. 60/665,575, filed on Mar. 25, 2005.

(51) Int. Cl.
  *F02D 23/00*      (2006.01)
  *F02B 31/00*      (2006.01)
(52) U.S. Cl. .................................. 60/603; 60/605.2
(58) Field of Classification Search ........... 60/600–603, 60/605.2; 123/559.1
  See application file for complete search history.

(56) References Cited

U.S. PATENT DOCUMENTS

| | | | | |
|---|---|---|---|---|
| 6,092,512 A * | 7/2000 | Ma | ........................ | 123/568.15 |
| 6,651,432 B1 * | 11/2003 | Gray, Jr. | ..................... | 60/605.2 |
| 6,725,829 B2 * | 4/2004 | Kataoka et al. | ............. | 123/299 |
| 6,857,263 B2 | 2/2005 | Gray | | |
| 6,973,786 B1 | 12/2005 | Liu | | |
| 7,047,741 B2 * | 5/2006 | Gray, Jr. | ....................... | 60/603 |

* cited by examiner

*Primary Examiner*—Hoang M Nguyen
(74) *Attorney, Agent, or Firm*—David H. Read

(57) ABSTRACT

Improved transient response times are obtained while maintaining low emissions with a low pressure EGR system through methods for quickly obtaining a desired oxygen concentration for charge-air to be used for combustion. Under a first method, fuel quantity in the main combustion event is controlled in the combustion process to produce exhaust around a relatively constant target exhaust oxygen concentration value. By keeping the exhaust oxygen concentration levels at a relatively constant value, lag time in waiting for low pressure EGR valve adjustments during transients may be avoided, and the system's air handling response to meet transients may be paced solely by adjusting the mass of air to be supplied (i.e. boost response). Under a second method, a multiple-stage combustion process is utilized, in which fuel feed is controlled in a small, preliminary HCCI-type combustion event in order to produce a target oxygen concentration of charge-air to be used for the second, main combustion event. Under a third method, exhaust rebreathing is used to produce a target oxygen concentration of charge-air to be used for combustion.

19 Claims, 2 Drawing Sheets

CONTROL METHODS FOR LOW EMISSION INTERNAL COMBUSTION SYSTEM

RELATED APPLICATIONS

This application claims priority from U.S. provisional application 60/665,575, filed Mar. 25, 2005.

BACKGROUND AND DESCRIPTION OF RELATED ART

1. Field of the Invention

The present invention relates to EGR and combustion control processes to assist in the cost-effective lowering of harmful NOx emissions produced in diesel internal combustion engines, with good transient response times.

2. Background of the Invention, and Description of the Related Art

The continuing use of diesel engines in motor vehicles greatly adds to the atmospheric presence of harmful pollutants such as nitrogen oxides (NOx). Conventional diesel engines emit NOx substantially in excess of acceptable environmental levels. Nevertheless, because of their fuel efficiency, diesel engines remain preferable to gasoline engines for many applications. Attempts to reduce NOx emissions from diesel engines have therefore continued for many years.

There is a need in the art for a cost-effective robust diesel combustion system that is capable of maintaining emissions levels of NOx within upcoming federally mandated environmentally acceptable levels (defined for purposes of this invention as 0.2 g/bhp-hr or lower, after possible exhaust aftertreatment). Reducing NOx emissions in diesel engines to the 0.2 g/bhp-hr standard is generally believed to require utilization of NOx aftertreatment such as a NOx absorber, NOx trap, or Urea/SCR. However, industry views such NOx aftertreatment technologies as presenting cost and durability challenges. It is therefore potentially desirable to use, in conjunction with and in addition to such NOx aftertreatment, methods to reduce NOx formation in combustion and thereby reduce the NOx-reduction burden to be handled through NOx aftertreatment.

Exhaust gas recirculation (EGR) is a known method in the art to lower engine-out NOx emissions, although the extent of EGR use is generally limited by an increase in smoke formation and loss of efficiency that occurs as the EGR ratio reaches high levels. EGR usage to lower NOx formation in diesel engines has generally stayed at EGR/ambient air ratios lower than 25% for medium and higher load conditions.

High pressure EGR (i.e., recirculating exhaust gas upstream of the turbine in the exhaust line, before the exhaust gas expands in the turbine) is the most common form of exhaust gas recirculation. However, significant use of high pressure EGR requires significant and expensive cooling of the hot recirculated exhaust gas, as well as an adverse pressure differential across the engine to move the EGR from the exhaust to the engine intake system.

Low pressure loop EGR systems are an attractive alternative that may also be used to lower engine-out NOx emissions, allowing some natural cooling of the exhaust gas (e.g., in expansion and transport of the exhaust gas through the turbine and exhaust line) and therefore reducing cooling requirements and costs for EGR, as well as avoiding the pumping losses inherent in high pressure EGR systems. But low pressure EGR systems are nevertheless generally avoided in the art due to concerns with transport delays (lag time) in EGR adjustments associated with such systems, which are made by adjustment of EGR levels can generally pace the system's response time during transients. Attempts to control in-cylinder NOx formation through low pressure EGR valve adjustments are challenged to keep up with the transient response times and system responsiveness desired for motor vehicle engine applications.

As a result, in-cylinder control of NOx formation during transients has been difficult to achieve in the art. Transient changes in the operating conditions of a diesel engine, such as upon vehicle acceleration, can result in significant NOx or PM emissions if EGR flow rate and level adjustments do not keep up with the changes in fuel feed and boost levels necessary to meet the change in power demand. For example, temporary fuel levels in excess of desired fuel/oxygen ratios can occur in transients, with resulting increased PM levels. Likewise, if intake oxygen concentrations rise in transients, an increase in NOx emissions will result. Such problems are a common occurrence in the prior art, as it is also conventional to stop exhaust gas recirculation during an increase power demand, which therefore results in an increase in the intake oxygen concentration, and can therefore cause spikes in NOx emissions during such transients. Such emissions during transient changes can cause vehicles to fail emission standards even where such vehicles could meet the emission standards at steady state conditions.

Thus, it is desirable to reduce the time required for EGR adjustments during transients in a low pressure EGR loop system, when the goal is to maintain consistent or low NOx emissions during rapid engine speed and load transitions.

As disclosed in commonly assigned U.S. Pat. No. 6,857,263, the teachings of which are incorporated herein by reference, active control of the oxygen concentration of charge-air used in combustion in a diesel engine can be used to significantly reduce formation of NOx in combustion. Said commonly assigned U.S. Pat. No. 6,857,263 also discloses one method for maintaining control of the oxygen concentration of charge-air used in combustion in a diesel engine through transients without an impediment to engine responsiveness, by maintaining the exhaust oxygen concentration and intake oxygen concentration relatively constant from cycle to cycle for at least medium and high loads, and through transients. The relatively constant oxygen concentration of charge-air used for combustion could be any range selected below 20%, depending on the particular NOx formation acceptable for the engine system. Without a NOx aftertreatment system, the oxygen concentration is preferably below 16%, within a tight range somewhere between 10% and 15%. On the other hand, with a NOx aftertreatment device present in the system, the oxygen concentration range for combustion could be higher for better efficiency (e.g. 16%, 17%, 18%, or 19%). The control of oxygen concentration to a relative constant allows continued control of NOx formation through transients without a need for transient response to be paced by adjustments in the low pressure EGR system.

However, for improved efficiency, it would also be desirable if the oxygen concentration of the charge-air used in combustion could be selectively controlled to an oxygen concentration varying with engine condition, with good transient response.

OBJECT OF THE INVENTION

It is therefore an object of the present invention to provide cost-effective and robust diesel combustion systems and EGR systems capable of maintaining NOx emissions within upcoming environmental standards.

It is also an object of the present invention to provide new methods for controlling NOx formation through management of the charge-air oxygen concentration and for quickly obtaining a desired oxygen concentration of charge-air for combustion, to reduce NOx formation in both steady-state and transient operating conditions.

SUMMARY OF THE INVENTION

In the present invention, low NOx formation and good transient response times in a diesel combustion system are obtained primarily through use of low pressure EGR and methods for quickly obtaining a desired oxygen concentration of charge-air for combustion.

Under a first method, fuel quantity is controlled in the combustion process to produce exhaust around a target exhaust oxygen concentration value, and to keep the exhaust oxygen concentration levels at a relative constant around that value for medium or high loads. As a result, variance can be reduced in the oxygen concentration of the charge-air mixture that results upon recirculation of a portion of the exhaust. Trimming of the oxygen concentration of charge-air used in combustion (through a high pressure EGR loop or other relatively fast means such as described later herein) may then be performed as desired without increasing transient response time.

Under an additional or alternative method, a multiple-injection strategy is utilized, in which an early, preliminary fuel injection and combustion event in a cycle produce a desired oxygen concentration of the charge-air to be used for the second, main combustion event for the cycle. In this manner, oxygen concentration control for NOx-reduction during transients may be performed without waiting for transport delays accompanying gross EGR adjustments to control oxygen concentration in the low pressure EGR system.

By performing transients in a low pressure EGR internal combustion system without waiting for low pressure EGR adjustments to be made, the system's air handling response to meet transients (requiring changes in the overall oxygen amount required for complete combustion in the cylinder) may be paced solely by adjusting the mass of air to be supplied (i.e. boost response), rather than waiting for the determination and/or adjustment of EGR or oxygen concentration levels in the low pressure EGR system in order for the engine demand to be met and/or NOx spikes to be avoided. Transient response paced primarily by boost pressure allows the engine system's response time to be on the same basis as conventional diesel engine response times, even while using a low pressure EGR loop for increased reduction of NOx formation. To the extent that relatively modest excursions of the exhaust oxygen levels or EGR flow rates can be sensed or determined, those skilled in the art have shown equivalent capability to make modest small adjustments in EGR flow through transients in order to maintain the intake oxygen concentration within the required target range.

In addition, by control of oxygen concentration through transients, engine-out NOx or PM emissions may be reduced, avoiding high NOx or PM spikes. This allows for minimizing the NOx aftertreatment volume or PM aftertreatment volume (or precious metal loading), and thus serves to minimize aftertreatment costs. It also may increase the durability of the NOx aftertreatment or PM aftertreatment devices in that the concentration of NOx or PM taken into the aftertreatment device can be maintained below desired limits. Controlling the NOx concentration of the feedgas to the NOx aftertreatment to avoid excursions beyond upcoming Heavy Duty Not to Exceed (NTE) requirements, at all operating conditions, is further of benefit.

DETAILED DESCRIPTION OF THE INVENTION

Figure 1:
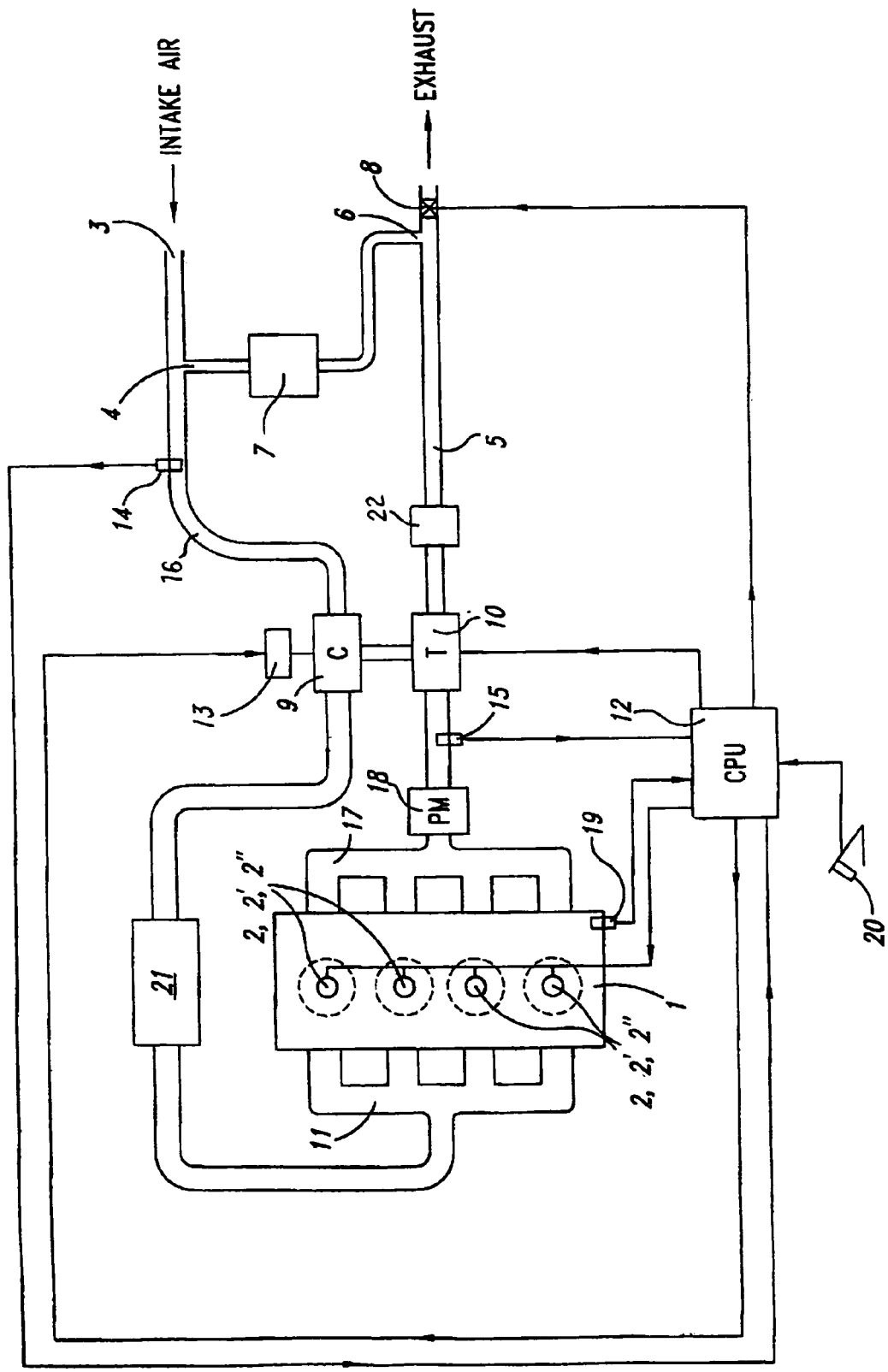
FIG. 1 is a schematic view of a preferred embodiment of an internal combustion engine system configured to use methods of the present invention.

An internal combustion engine system with low pressure EGR is shown in FIG. 1 in schematic form. It may be noted that FIG. 1 is similar to FIG. 1 of applicant's recently issued U.S. Pat. No. 6,857,263.

Referring to FIG. 1, an internal combustion diesel engine 1 is shown. Engine 1 receives fuel through direct cylinder fuel injectors 2, 2', 2", etc. Engine speed is provided to controller (CPU) 12 by speed sensor 19. Torque command level is provided to controller 12 by accelerator pedal sensor 20. Ambient air enters intake line 16 at port 3. Exhaust gas blends with the ambient air at port 4, thereby forming a charge-air mixture. Exhaust gas is routed from exhaust pipe 5 at port 6 through exhaust gas cooler 7 to port 4. EGR control valve 8 is located just downstream of port 6 in exhaust pipe 5. By restricting flow through valve 8, exhaust gas flow rate through port 6 is controlled. The combined ambient air and recirculated exhaust gas (collectively "charge-air") flows through intake line 16 and is compressed by compressor 9. Compressor 9 may be a single stage compressor or two or more compressors in series or parallel, and is primarily driven by exhaust gas expander (turbine) motor 10 (which may be a single stage turbine or two or more turbines in series or parallel) to provide a controlled boost pressure level to intake manifold 11. Controller (CPU) 12 sends appropriate signals to expander motor 10 to control boost. An optional electric or hydraulic motor 13 may be used and controlled by controller 12 to provide rapid boost level changes to assist the exhaust expander motor 10 and compressor 9 in providing rapid torque response. Alternatively, a supercharger (within the compressor 9 representation) may be used to provide more rapid torque response and additional boost capability. Controller 12 therefore sends appropriate signals to motor 13 and/or to the supercharger 9 to control boost level during transients and during any operating conditions where motor 10 alone cannot supply sufficient and fast boost pressure.

Compressed charge-air may optionally (and preferably) flow through cooler 21 to intake manifold 11 to cool the charge-air to specified levels, if desired.

Oxygen sensor 14, placed in the intake line 16 at any point downstream of combining recirculated exhaust gas with the ambient air, may be used to directly determine the oxygen concentration in the charge-air. Optional exhaust oxygen sensor 15 in exhaust line 5 may also be used to directly determine the oxygen concentration in the engine exhaust gas. Alternatively, exhaust and intake oxygen concentrations may be determined from each other and the EGR ratio, or by other means or calculations as are well-known to those skilled in the art.

In the preferred embodiment, charge-air enters the combustion chamber (not shown) through conventional valves (not shown) in a conventional manner and exhaust gases leave the combustion chamber through conventional valves (not shown) and leave engine 1 through exhaust manifold 17. PM exhaust aftertreatment device 18 may include a particulate trap oxidizer to remove any particulate emissions and a catalyst to oxidize residual fuel and carbon monoxide. NOx aftertreatment device 22 (e.g., a NOx absorber, NOx trap, or Urea/SCR device) likewise works to bring NOx emissions within environmental standards. For the purposes of this invention, the sequential ordering of PM aftertreatment device 18, NOx aftertreatment device 22, and optional exhaust oxygen sensor 15 in the exhaust line 5 to each other and with respect to turbine 10 is not critical to the present invention.

The current "best mode" for simplified control of the internal combustion engine system through transients, to meet the desired emissions results, will now be set forth. In the event of a change in the driver's demand for engine power, the change in power demand is first sensed and communicated to controller 12 by pedal sensor 20. With this information, controller 12 then, preferably by utilizing maps established and stored therein: (i) determines the desired load for combustion given the driver's power demand, and (ii) determines the appropriate fuel quantity and boost needed to achieve that desired load, with the quantity of fuel selected to achieve a predetermined target exhaust oxygen concentration. Smoke/PM emissions reduction is optimized in this method if the target exhaust oxygen concentration is continuously maintained at a level sufficient (e.g. at least ~2% to ~6%) to provide for continuous PM trap 18 regeneration without the requirement for periodic lean excursions for trap regeneration to occur.

As stated above, control of oxygen concentration in the present invention is further improved in the present invention, giving improved transient response times, by efforts to eliminate or minimize the oxygen concentration changes made in operation. For example, the preferred method for control of the present invention maintains the oxygen concentration in the engine exhaust to a relative constant. The particular value chosen for the exhaust oxygen concentration is not necessarily critical, and could be a value such as 2%, or 4%, or 6%. As stated above, exhaust oxygen concentration may be maintained to the selected relative constant by matching the quantity of fuel used with the amount of in-cylinder oxygen available to produce the desired exhaust oxygen concentration.

With the oxygen concentration in the exhaust relatively constant (e.g. at 4%), and with the oxygen concentration of ambient air also relatively constant (i.e. approximately 21%), it can be seen that the resulting blended charge-air oxygen concentration in intake line 16 downstream of port 4 may then also be fixed if desired simply by maintaining EGR valve 8 and the EGR ratio at the corresponding set point for the desired blended oxygen concentration.

The desirability of maintaining exhaust oxygen concentration and intake charge-air oxygen concentration to acceptable relative constant values is to satisfy the competing needs in the prior art for a diesel combustion system that both maintains low engine-out NOx and PM emissions during transients and has a fast response time in transients. With a low pressure EGR system with relatively constant exhaust oxygen concentrations and intake charge-air oxygen concentrations as in the present invention, the system's air handling response to meet transients (e.g., with transients requiring an increase in the overall oxygen amount required for complete combustion in the cylinder) may generally be paced solely by adjusting the mass of charge-air to be supplied (i.e. boost response) and thus will be fast, and yet NOx-formation in the engine will stay low because intake oxygen concentration stays low during the transient.

It should be noted, in contrast, that with a high pressure EGR system, because the exhaust gas is recirculated to the intake line or intake manifold downstream of where the boost system's compression of ambient air occurs (and thus additional boost is supplied by compression of higher oxygen concentration ambient air, instead of the lower oxygen concentration mixed charge-air as in a low pressure EGR system), the increase of boost corresponding to an increase in power demand will result in a net increase of intake charge-air oxygen concentration and thus can result in NOx spikes during such transients. Similarly, in a low pressure EGR system where there is not a relatively constant oxygen concentration in the charge-air, unless the transient response is slowed to allow EGR adjustments to keep up with the changes in fuel feed and boost levels that correspond with the change in power demand, either temporary fuel levels in excess of desired fuel/oxygen ratios will result in increased PM levels in the transients, or else, if intake oxygen concentrations are too high for the new operating condition, a spike in NOx emissions will result.

From the foregoing, it should be appreciated that although relatively constant values of intake oxygen or exhaust oxygen are desired to minimize NOx or PM formation during combustion, there may be specific operating conditions where the target oxygen concentration would be different from the relatively constant value for most operation conditions. For these specific conditions, such as during particularly aggressive transients, the target relatively constant intake oxygen concentration can be increased by 1% or perhaps even more, such that the combustion produced NOx and PM formation remain acceptably low (i.e., within the aftertreatment system's ability to reduce to the levels of the emissions standards).

Figure 2:
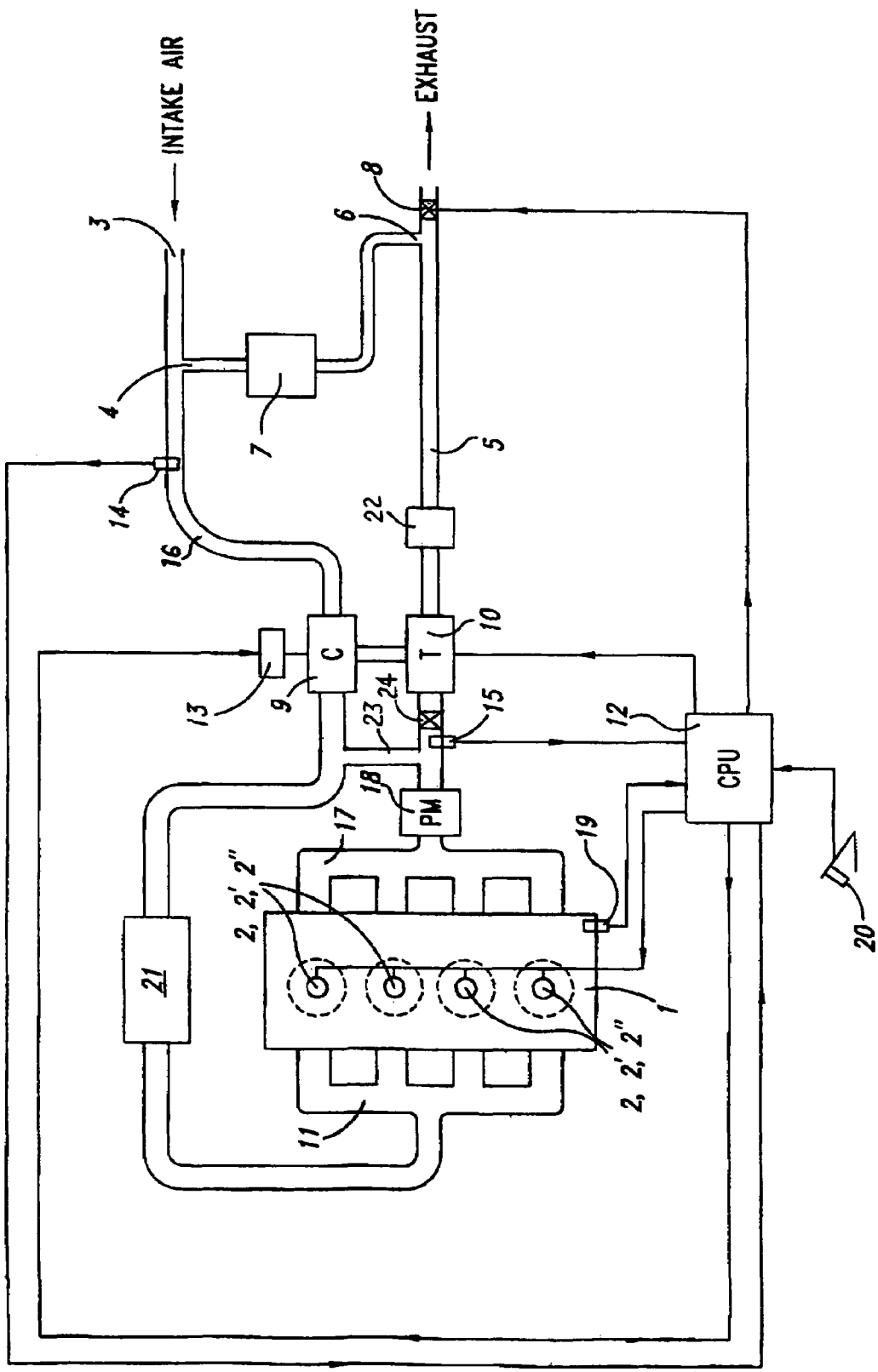
FIG. 2 is a schematic view of an alternative internal combustion engine system, also configured for use with the methods of the present invention.

Trimming of the blended charge-air mixture's oxygen concentration may occur in various ways. As one example, the alternative internal combustion engine system set forth in FIG. 2 provides a high pressure EGR line 23 (controlled by high pressure EGR valve 24) to create a dual EGR loop for the internal combustion engine system. In this alternative embodiment, the oxygen concentration of the charge-air flowing to intake manifold 11 and actually taken into the cylinders of engine 1 for combustion may be adjusted through adjustments to high pressure EGR valve 24. EGR adjustments made in a high pressure EGR loop in this manner produce less lag time in controlling intake oxygen concentration than low pressure EGR adjustments via adjustment of low pressure EGR valve 8. This high pressure EGR trimming of the intake oxygen concentration for combustion enables optimization of the oxygen concentration for efficiency and/or emissions, while still obtaining adequate transient response times and allowing the benefits of low pressure EGR for most of the exhaust produced in the engine system.

Alternatively, trimming of the blended charge-air mixture's oxygen concentration could occur prior to combustion through other means, such as through an optional second ambient air intake port or other port for additional blending of air, recirculated exhaust gas, or other gas, to adjust oxygen concentration, as would be understood in the art.

As another alternative, or in addition to the foregoing, a multiple-stage combustion process may be utilized to control oxygen concentration in the cylinder, in which fuel feed is controlled in a first combustion event in a cycle in order to produce a target oxygen concentration of charge-air to be used for the second, main combustion event in the same cycle. The exhaust oxygen concentration after the main combustion event may also be controlled. Thus, oxygen concentration control for engine-out NOx-reduction during transients may be performed through fuel control for the preliminary combustion event, either alone or in conjunction with the additional low pressure exhaust gas recirculation methods of the present invention.

Use of a multiple-stage combustion process for control of oxygen concentration will now be explained. For example, with reference to FIG. 1 under this second method, the desired engine speed/load condition and the actual oxygen concentration of charge-air being taken into the cylinders are first determined (e.g., by CPU 12). The desired engine speed/load condition may be determined based on driver torque demand in a conventional manner. The oxygen concentration of air taken into the cylinders may be determined, for example, through oxygen sensor 14, which is preferably placed in the intake line after port 4 and shortly before intake into the cylinders. Alternatively, the oxygen concentration of charge-air being taken into the cylinders could be derived from the exhaust oxygen concentration and the position of the EGR valve 8, or by other means. Next, for the desired engine speed/load condition, there has preferably been determined (e.g., by CPU 12) a target oxygen concentration to be obtained for use in the primary/main combustion event for each engine cycle. This target oxygen concentration may be a constant across many engine speed/load conditions. Alternatively, maps or tables of optimal oxygen concentration values for various engine speeds and loads may be used for the determination, balancing emissions and/or efficiency tradeoffs in an optimal manner for various engine speed/load points.

Knowing the boost (charge-air mass), oxygen concentration of charge-air being taken into the cylinder, target oxygen concentration for the mixture for combustion for an initial and main combustion event, and the desired engine output, CPU 12 determines the fuel quantity for the preliminary, first injection. The first injection event is preferably a precise and very small quantity of fuel injected well before the main fuel injection event. Preferable timing of the first injection would be between 150 degrees and 45 degrees before TDC. This will then result in good mixing and allow for near-homogeneous auto-ignition as the charge mixture nears TDC. The resulting HCCI-type initial combustion event will reduce the overall oxygen concentration of the remaining trapped mixture in the cylinder to the desired oxygen concentration for the main combustion event. The phasing of this initial HCCI-type combustion event can be optimized for best overall engine efficiency by balancing the quantity of fuel injected to the mass of the charge mixture and its pre-HCCI oxygen concentration, while achieving the additional required oxygen concentration reduction necessary for the main combustion event's oxygen concentration. The main combustion event may then proceed, and could be timed as for conventional diesel combustion, or slightly later to reduce peak cylinder pressures if desired. As can be seen, as the main combustion event occurs with a charge-air oxygen concentration that has been reduced, so as to achieve a reduced formation of NOx from the overall combustion event.

One benefit of this alternative multiple-injection method for control of oxygen concentration for combustion is that the oxygen concentration may be controlled by the fast process of fuel control without the lag time of oxygen concentration control through low pressure EGR valve 8 adjustments. Thus, a low pressure EGR loop may also be used with this method of the invention without requiring a delay.

As an additional alternative, to optimally phase the initial HCCI-type combustion event, the trapped charge-air mixture's total mass, bulk temperature and oxygen concentration may also be reduced by allowing re-breathing of exhaust products from the prior combustion cycle back into the combustion chamber through an added exhaust valve event during the intake stroke. This re-inducted exhaust gas would also act to modify the bulk temperature of the trapped mass and to reduce the overall oxygen concentration in the cylinder for an optimal phasing of the initial HCCI-type combustion event and minimum NOx formation from the main and overall combustion event.

It can be seen that each of the methods of oxygen concentration control described and set forth in this application could also be used in conjunction with engine systems other than diesel combustion systems that use, or might benefit from use of, low pressure EGR to reduce NOx formation. For example, the control methods could apply to homogeneous charge compression ignition (HCCI) engines or alcohol engines. Commonly assigned U.S. Pat. No. 6,651,432 ("Controlled Temperature Combustion Engine") describes examples of such engines. Thus, the inventions and methods herein are not intended to be limited to the field of diesel engines.

From the foregoing it will be appreciated that, although various specific embodiments of the invention have been set forth herein, further modifications could also be made without deviating from the spirit and scope of the invention.

In addition, the term "relatively constant" used at times in the application necessarily encompasses a range around the target value or range chosen, thereby allowing for some tolerance of variance that does not significantly affect NOx formation. The amount of variation that is possible without significantly affecting NOx formation will depend on engine conditions, and is partially a matter of testing, as will be understood in the art.

I claim:

1. A method of operating a turbocharged diesel engine system, comprising:
   recirculating exhaust gas from downstream of a turbine in an exhaust line in the engine system to upstream of a compressor in an intake line in the engine system, thereby creating a charge-air mixture in the intake line;
   taking into a combustion chamber of the engine a portion of the charge-air mixture for combustion;
   injecting a quantity of fuel into said combustion chamber in an amount selected to produce a target resulting exhaust oxygen concentration upon combustion; and
   selectively also recirculating a portion of the exhaust gas from upstream of the turbine in the exhaust line to downstream of the compressor in the intake line in an amount to produce a desired oxygen concentration for the charge-air mixture prior to being taken into the combustion chamber for combustion.

2. The method of claim 1, wherein the target exhaust oxygen concentration is a relatively constant value from cycle to cycle.

3. The method of claim 2, wherein the relatively constant value is a value between 2% and 6%.

4. The method of claim 1, further comprising selectively adding ambient air to the charge-air mixture downstream of the compressor in the intake line in an amount to produce a desired oxygen concentration for the charge-air mixture prior to being taken into the combustion chamber for combustion.

5. The method of claim 1, further comprising opening one or more exhaust valves to the combustion chamber after the beginning of the intake stroke and prior to combustion, to take in exhaust products into the combustion chamber and thereby produce a desired, reduced, overall oxygen concentration for the charge-air mixture in the combustion chamber for combustion.

6. The method of claim 1 wherein, in a single cycle, prior to injecting the said quantity of fuel for combustion, the method additionally comprises injecting a first, smaller, quantity of fuel into the combustion chamber for a first combustion event with the charge-air mixture, to produce a target reduced oxygen concentration for the charge-air mixture prior to a subsequent main combustion event.

7. The method of claim 6, further comprising opening one or more exhaust valves to the combustion chamber after the beginning of the intake stroke and prior to combustion, to take in exhaust products into the combustion chamber and thereby modifying the bulk temperature and overall oxygen concentration for the charge-air mixture to optimally phase the first, smaller quantity of fuel's combustion phasing.

8. A method of operating an internal combustion diesel engine, comprising:
taking into a combustion chamber of the engine a charge-air mixture;
selectively injecting a first quantity of fuel into the combustion chamber for a first combustion event with the charge-air mixture, in an amount selected to produce a target reduced oxygen concentration in the charge-air mixture; and
subsequently injecting a second, main, quantity of fuel into the combustion chamber for combustion with the charge-air mixture.

9. The method of claim 8, further comprising recirculating exhaust gas from downstream of a turbine in an exhaust line in the engine system to upstream of a compressor in an intake line in the engine system, thereby creating said charge-air mixture in the intake line.

10. An internal combustion diesel engine system comprising a low pressure EGR system and a NOx aftertreatment device in an exhaust line thereof, wherein oxygen concentration of air to be used in combustion is maintained at a relatively constant value less than 20% from cycle to cycle, for at least medium and high loads, in order to lower engine-out NOx formation upstream of the NOx aftertreatment device.

11. The internal combustion diesel engine system of claim 10, wherein the oxygen concentration of air to be used in combustion is maintained at a relatively constant value below 18O0.

12. The internal combustion diesel engine system of claim 10, wherein the oxygen concentration of air to be used in combustion is maintained at a relatively constant value below 17%.

13. The internal combustion diesel engine system of claim 10, wherein the oxygen concentration of air to be used in combustion is maintained at a relatively constant value below 16%.

14. The internal combustion diesel engine system of claim 10, wherein the oxygen concentration of air to be used in combustion is maintained at a relatively constant value which is between 10% and 15%.

15. A method of operating a turbocharged engine system, comprising:
recirculating exhaust gas from downstream of a turbine in an exhaust line in the engine system to upstream of a compressor in an intake line in the engine system, thereby creating a charge-air mixture in the intake line;
taking into a combustion chamber of the engine a portion of the charge-air mixture for combustion;
injecting a quantity of fuel into said combustion chamber in an amount selected to produce upon combustion a target resulting exhaust oxygen concentration which is a relatively constant value from cycle to cycle.

16. The method of claim 15, wherein the relatively constant value is a value between 2% and 6%.

17. The method of claim 15, further comprising:
selectively also recirculating a portion of the exhaust gas from upstream of the turbine in the exhaust line to downstream of the compressor in the intake line in an amount to produce a desired oxygen concentration for the charge-air mixture prior to being taken into the combustion chamber for combustion.

18. The method of claim 15, farther comprising selectively adding ambient air to the charge-air mixture downstream of the compressor in the intake line in an amount to produce a desired oxygen concentration for the charge-air mixture prior to being taken into the combustion chamber for combustion.

19. The method of claim 15, further comprising opening one or more exhaust valves to the combustion chamber after the beginning of the intake stroke and prior to combustion, to take in exhaust products into the combustion chamber and thereby produce a desired, reduced, overall oxygen concentration for the charge-air mixture in the combustion chamber for combustion.

* * * * *